Nov. 7, 1933.                W. J. BROWN                1,934,523
                           SIGNALING SYSTEM
                         Filed Dec. 31, 1927
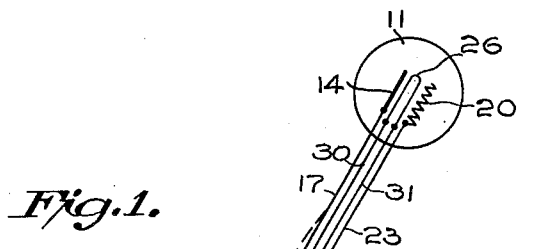
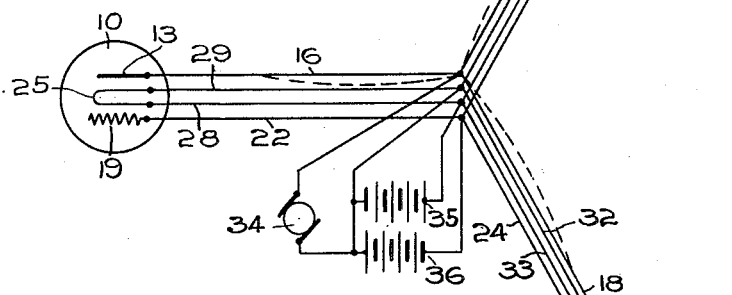
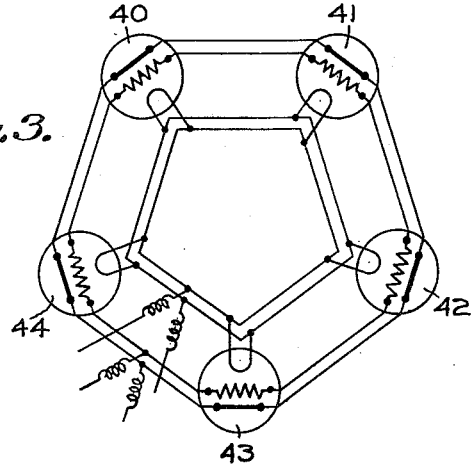
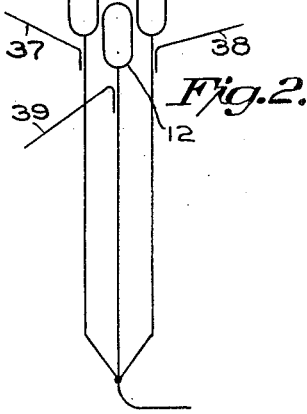
INVENTOR
Walter J. Brown
BY
ATTORNEY Patented Nov. 7, 1933

1,934,523

UNITED STATES PATENT OFFICE 1,934,523

SIGNALING SYSTEM

Walter John Brown, Brooklands, England, assignor to Associated Electrical Industries, Limited, Westminster, England, a British company Application December 31, 1927, Serial No. 243,880, and in Great Britain January 15, 1927

5 Claims. (Cl. 250—36)

This invention relates to high frequency apparatus and is concerned with the production and utilization of polyphase electrical oscillations of very high frequency, such for example as polyphase oscillations of a frequency of ten million to several hundred million cycles per second.

It has already been suggested that two vacuum electric discharge devices should have their corresponding electrodes connected together by means of conductors consisting of rectilinear parts for the purpose of generating high frequency oscillations under appropriate conditions but these oscillations are only single phase oscillations whereas the present invention contemplates the generation and utilization or reception of polyphase oscillations.

According to the invention a high frequency polyphase electrical apparatus comprises a plurality (that is more than two) of multiple electrode vacuum electron discharge devices having their corresponding electrodes severally electrically connected together by means of conductors consisting of substantially rectilinear parts.

One form of polyphase oscillatory system, according to the invention comprises a plurality of multiple electrode vacuum electric discharge devices disposed at the corners of a regular polygon and conductors connecting the corresponding electrodes of said devices together. The said conductors are of substantially equal length and are arranged substantially symmetrically, for example, all radiating from points near the centre of symmetry of said polygon, or all lying in or near the sides of said polygon. Of these two arrangements of conductors the first may be called the "star" arrangement and the second may be called the "mesh" arrangement. In the case of the "star" arrangement of conductors connections may be made to the star points for the purpose of supplying energy to or determining the mean potential of the electrodes. In the case of the "mesh" arrangement such connections may be effected by way of high frequency choke coils.

Instead of arranging the devices spaced apart from one another these may be disposed close to one another, a symmetrical arrangement preferably being maintained, and the conductors connecting the several sets of corresponding electrodes may extend in a direction normal to the plane in which the devices are disposed.

In the accompanying drawing Fig. 1 represents, by means of a diagrammatic view partly in perspective, a preferred embodiment of the invention for the generation of three-phase oscillations. Fig. 2 represents diagrammatically another preferred form of generator of three-phase oscillations and Fig. 3 is a diagram representing a generator of five-phase oscillations.

Referring now to Fig. 1, three three-electrode thermionic valves 10, 11 and 12 are disposed in a plane at the corners of an equilateral triangle. The three anodes 13, 14 and 15 are each connected to a star point at the centre of the equilateral triangle by straight conductors 16, 17 and 18. The three control electrodes 19, 20 and 21 are similarly connected to a star point immediately below the aforementioned star point by straight conductors 22, 23 and 24. The ends of the filamentary cathodes 25, 26 and 27 are also connected by pairs of straight conductors 28 and 29, 30 and 31 and 32 and 33.

The star point to which the three anodes 13, 14 and 15 are connected is connected to the positive pole of a direct current generator 34, the negative pole of which is connected to one of the star points to which the cathodes 25, 26 and 27 are connected. The generator 34 serves as a source of energy for supplying the circuits of the anodes. A battery 35 is connected across the two star points to which the cathodes 25, 26 and 27 are connected to provide energy for heating the cathodes. A battery 36 is connected between the negative end of the battery 35 and the star point to which the control electrodes 19, 20 and 21 are connected for the purpose of determining the mean potential of the control electrodes. The battery 36 may be replaced by or supplemented by a high resistance, either shunted by a condenser or not, in a manner well known.

The four star points of the electrode systems are theoretically nodal points and no high frequency potential should exist between them. To allow for any dissymmetry, however, condensers may be connected immediately between the four star points and these serve the additional purpose of guarding against the possibility of single-phase oscillations being set up in the leads from the batteries to the star points.

The arrangement described is capable of generating oscillations in the conductors connecting the electrodes of the several valves to the star points, the oscillations in the conductors connected to the valve 11 lagging in phase 120° behind those in the conductors connected to the valve 10, and the oscillations in the conductors connected to the valve 12 lagging 120°, behind those in the conductors connected to the valve 11. The arrangement described, however, may equally well generate three-phase oscillations of which the direction of phase revolution is opposite to that previously described, the oscillations in the conductors connected to the valve 11 leading in phase 120° in front of those in the conductors connected to the valve 10, and the oscillations in the conductors connected to the valve 12 leading 120° in front of those in the conductors connected to the valve 11.

The direction of phase rotation of the apparatus may be determined by introducing a dissymmetry or advancing or retarding the phase of the electromotive force somewhat at one of the electrodes. For example, in order to cause the phase rotation to be such that the oscillations in the conductors connected to the valve 10 lag behind those in the conductors connected to the valve 11, the control electrode 20 and conductor 23 may be so arranged that they have more capacity to the anode 15 and conductor 18 than they have to the anode 13 and conductor 16. Similarly the capacity between the control electrode 21 and conductor 24 and the anode 13 and conductor 16 may be made greater than between the control electrode 21 and conductor 24 and the anode 14 and conductor 17, and also the capacity between the control electrode 19 and conductor 22 and the anode 14 and conductor 17 is made greater than the capacity between the control electrode 19 and conductor 22 and the anode 15 and conductor 18. Such an arrangement of the capacities tends to advance the phase of the control electrode potential in each of the several valves and, as well as having the effect of causing the phase rotation to be in the desired direction, enables the system to be designed to generate oscillations at very high frequencies since the advance in phase of the control electrode potentials to some extent compensates for the time taken for the propagation of a wave of electron density across the spaces of the control electrodes and anodes of the valves. The arrangement of the capacities in the manner described may be effected by bending or bulging the anode connections 16, 17 and 18 in the manner shown in dotted lines. Such bending or bulging has the advantage of increasing the capacities in the manner required, and also of adding some slight extra inductance to the anode circuits thus somewhat retarding the phase of the several anode potentials. The said retardation of phase of the anode potentials with respect to the control electrode potentials also tends to promote the generation of oscillations at higher frequencies.

Alternatively, the control electrode connections 22, 23 and 24 may be bent in the reverse direction or projections may be placed upon the control electrode connections or upon the anode connections, or both, to increase the capacity between the appropriate control electrode and anode connections.

The arrangement described generates oscillations by virtue of the anodes being supplied at a potential highly positive with respect to the cathodes, while the control electrodes are maintained at a low positive, zero, or negative mean potential with respect to the cathodes. Alternatively, especially where the power dealt with by the apparatus is quite small, the control electrodes may be maintained at a highly positive potential with respect to the cathodes, while the anodes are maintained at a low positive, zero or negative potential with respect to the cathodes.

The arrangement illustrated in Fig. 2 is broadly similar to that described with reference to Fig. 1. The three valves 10, 11 and 12 are, however, brought close together and the conductor connecting the several electrodes to the star points, instead of lying substantially in or parallel to the plane of the valves 10, 11 and 12, extend in a direction substantially normal to that plane, with the result that the arrangement is substantially astatic. In Fig. 2 the four conductors associated with each of the several valves are shown by single lines.

For the purpose of abstracting energy from the arrangement illustrated in Fig. 2, three antennæ 37, 38 and 39 may be electrostatically coupled to the electrodes 16, 17 and 18 respectively. The loading of the oscillatory system by the antennæ 37, 38 and 39 may be adjusted by adjusting the capacity between them and the conductors 16, 17 and 18 or by varying the points at which they are connected to these conductors. The electric waves radiated by such a device may be concentrated as a pencil in one sense or direction only by means of a solid reflector for example of sheet metal placed behind or around the arrangement.

The two arrangements above described may be called star-connected arrangements. In Fig. 3 a five-phase mesh or delta-connected arrangement is diagrammatically illustrated. In this arrangement five valves 40, 41, 42, 43 and 44 are disposed at the corners of a regular pentagon. The electrodes of the valve 40 are severally connected to the corresponding electrodes of the valve 41 by rectilinear conductors, the electrodes of the valve 41 are severally connected to the corresponding electrodes of the valve 42 by similar rectilinear conductors, such connection being repeated until the pentagon is closed. All the rectilinear conductors are preferably of precisely the same length, connections are made to any point upon the several systems of conductors for the purpose of supplying energy to and/or determining the mean potential of the several electrodes. Since these connections cannot, in a mesh-connected arrangement, be effected at potential nodes, high frequency choke coils must be included in each of them.

The apparatus herein described for the generation of polyphase oscillations may be used for the reception of such oscillations by including it in a suitable receiving circuit.

It is preferred to arrange the apparatus to generate oscillations of a prime number of phases since this limits the number of possible modes of oscillation of the system to one.

I claim as my invention:

1. An oscillation generator comprising a plurality of electron discharge devices intersected by a plane, said devices being symmetrically disposed with respect to a reference point in said plane, and a plurality of parallel conductors devoid of lumped inductance connecting similar elements of said devices together, said conductors extending in a direction substantially normal to said plane and being of such length and so disposed to one another as to promote the generatoin of oscillations at a predetermined frequency.

2. A high frequency polyphase electrical apparatus comprising a plurality of multiple-electrode electric discharge devices disposed at the corners of a regular polygon, rectilinear conductors having substantially uniformly distributed capacity and inductance connecting corresponding electrodes of said devices together, and means for making the coupling of one tube with the succeeding tube different from the coupling of said one tube with the preceding tube.

3. A high frequency polyphase electrical apparatus comprising a plurality of multiple-electrode electric discharge devices disposed at the corners of a regular polygon, each device having a plate electrode and a control electrode, rectilinear conductors of substantially equal length and substantially symmetrically disposed connecting the corresponding electrodes of said devices together, the capacity between a rectilinear conductor connected to a control electrode of one device and a rectilinear conductor connected to a plate electrode of the succeeding tube being greater than the capacity between the rectilinear conductor connected to said control electrode and the rectilinear conductor connected to the plate electrode of the preceding tube.

4. A high frequency polyphase electrical apparatus comprising a plurality of multiple-electrode electric discharge devices disposed at the corners of a regular polygon, each device having a plate electrode, a control grid and an electron-emitting electrode, rectilinear conductors of substantially equal length and substantially symmetrically disposed connecting the corresponding electrodes and control grids of said devices together, the capacity between a rectilinear conductor connected to a control grid of one device and a rectilinear conductor connected to one of said electrodes of the succeeding tube being greater than the capacity between the rectilinear conductor connected to said control grid and a rectilinear conductor connected to one of said electrodes of the preceding tube.

5. A high frequency generator of polyphase currents comprising at least three multiple electrode electric discharge devices, conductors connecting similar electrodes of each device together, said conductors being devoid of lumped inductance, each discharge device and its connecting conductors being so disposed with respect to an adjacent device and its connecting conductors when taken in a predetermined sequence that the capacity between adjacent devices varies in a regular order.

WALTER JOHN BROWN.